J. A. FRASER.
AUTOMATIC STRAINER AND CAN FILLER.
APPLICATION FILED JULY 21, 1919.

1,341,119.

Patented May 25, 1920.

Inventor
Joseph Alfred Fraser,
By H. M. Plaisted,
Attorney.

UNITED STATES PATENT OFFICE.

JOSEPH ALFRED FRASER, OF GLENCOE, MISSOURI, ASSIGNOR TO LA SALLE INSTITUTE, OF GLENCOE, MISSOURI, A CORPORATION OF MISSOURI.

AUTOMATIC STRAINER AND CAN-FILLER.

1,341,119.      Specification of Letters Patent.      Patented May 25, 1920.

Application filed July 21, 1919. Serial No. 312,374.

*To all whom it may concern:*

Be it known that I, JOSEPH ALFRED FRASER, a citizen of the United States, residing at Glencoe, in the county of St. Louis and State of Missouri, have invented certain new and useful Improvements in Automatic Strainers and Can-Fillers, of which the following is a specification.

This invention relates to certain new and useful improvements in automatic strainers and can fillers especially adapted for dairy men in filling milk cans, the peculiarities of which are hereinafter described and claimed.

The main object of my invention is to provide means to shut off automatically the flow of liquid such as milk to one container, and thus prevent the overflow and waste of the liquid; and secondly for continuing the filling of an adjacent container by the overflow of liquid from my device, after a determined quantity has entered the first container.

Figure 1:
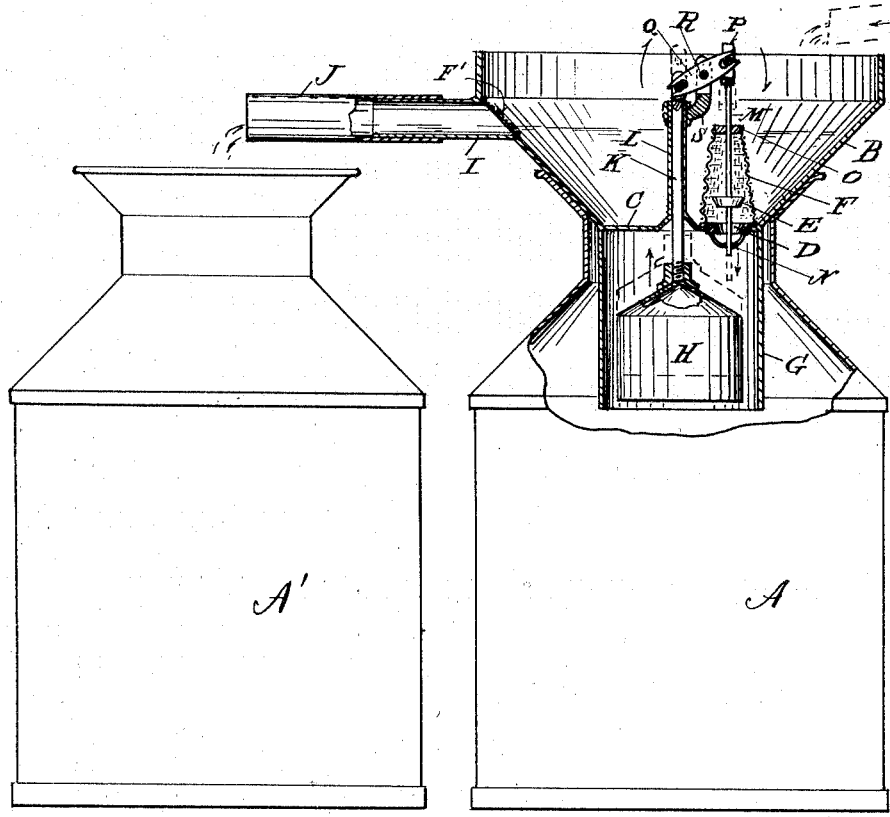
Figure 2:
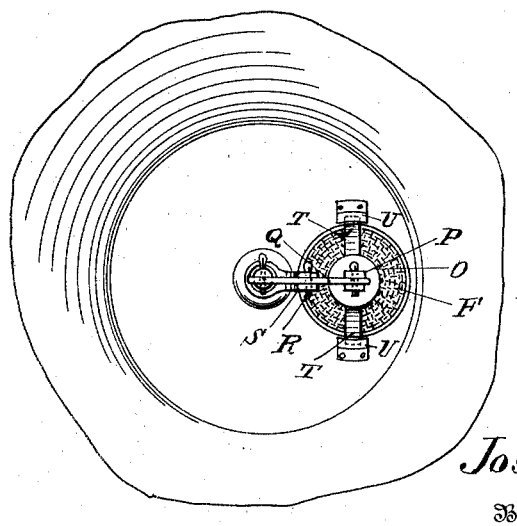

In the accompanying drawing on which like reference letters indicate corresponding parts, Figure 1 represents a sectional view of my device applied to a milk can partly in section, and illustrating the delivery of the overflow from one can into an adjacent can; and Fig. 2 an enlarged plan view of the central portion of my device.

When milk cans, for example, are filled with milk from a stream of milk from a cooler the attention of a man is constantly required to shut off the stream of milk and shift a new can to be filled. Delay and waste of milk and extra labor is thus required; while with the use of a device such as that illustrated herewith, a can of milk is filled with a predetermined quantity and then the overflow into an adjacent can continues without the attention of the operator. Thus two or more cans, by suitable arrangement of my device in multiple, may be automatically filled to a pre-determined amount by a constant stream of milk from the cooler, and save time in filling, prevent waste of the milk and dispense with much of the time and attention of the operator.

The letter A designates a milk can or other suitable container for a liquid, and A' an adjacent can. The can A is provided with my device comprising a receiving pan B preferably conical and adapted to fit the flaring top of an ordinary milk can as shown, and having a bottom C in which is an outlet D provided with a valve seat for a valve E preferably acting downward as shown in Fig. 1 to close the discharge outlet. A guard screen F of suitable mesh to act as a strainer for the liquid delivered to the receiving pan, surrounds and guards said discharge opening, and is preferably located above said discharge opening as shown in Figs. 1 and 2. The bottom of the can is provided with a tubular depending extension G, or otherwise formed to act as a retainer to steady the pan in its located position upon the milk can. Below the bottom C and preferably within said extension G is located a float H adapted to rise when the milk in said can reaches a certain level, and through operative connections with said valve E, to close the discharge opening, and prevent the admission of any more liquid to the can A. The pan has an overflow outlet pipe I with a telescopic extension J adapted to deliver the milk from said pan when the continuing flow of milk from a supply pipe as indicated by dashed lines, will cause it to rise in the pan, and overflow through the pipe I to the adjacent can A'. A screen F' guards this overflow pipe.

These operating connecting means preferably consist of a stem K, screwed or otherwise secured in the top of the float H and extending upward through a pipe L secured to said bottom C of the pan, to a point above the level of the liquid when it overflows to the level of the pipe I. The valve E is preferably mounted on a guiding valve stem M passing through a guide N on the opposite side of the discharge opening, and through the disk O forming the top of the strainer, and is provided at the top with a yoke P. A similar yoke is provided at the top of the stem K, and a slotted lever Q pivoted at R in a bracket S secured to the pipe L or otherwise, acts as a fulcrum for said lever. Pins in said yokes engage with slotted ends of said lever as shown in Fig. 1, so that when the float H rises, one end of said lever is raised and the other end of the lever is depressed and thereby depresses the valve and closes the discharge opening D. The milk flowing in through the strainer passes through the discharge opening into the can till it rises to such a level that it will lift the float as indicated by dashed lines in Fig. 1 and depress the valve. The weight of the moving parts is such that the normal position of the valve E is opened; the rising of the float however overbalances the weight of the parts and shuts off the entrance of the milk to the can A, allowing the pan to fill up and discharge through the overflow pipe I into the adjacent can A'. The attention of the operator is therefore not required at the instant of the filling of the can A as the overflow will proceed to fill the adjacent can A'. A multiple number of my devices may be applied to a series of cans or it may be used in connection with two cans as illustrated. No dust or foreign matter can enter the can A as the pan fills the mouth and the strainer guards the discharge opening of the pan.

The operative connections of the float and valve are readily separated for cleaning, as the stem K is screwed into the float and by removing the fulcrum pin of the lever the slot and pin connection at each end of the lever allows of the ready separation of the stems of float and valve respectively. Likewise the screen is preferably detachable by turning the screen around a vertical axis so that a pair of lips T Fig. 2, are disengaged from retaining clips U secured to the bottom of the pan adjacent to the discharge opening. Thus the sanitary requirements of cleanliness are readily obtained.

I claim:

1. A device of the character described comprising an overflow outlet and a discharge outlet, a screen for each of said outlets, a valve located in said discharge outlet a float located below said valve, and operative connections therebetween to effect the closing of the valve, whereby the closing of said valve will deliver the surplus through the screened overflow outlet, substantially as described.

2. A device of the character described comprising a receiving pan having an overflow outlet and a discharge outlet, a valve located in said discharge outlet, and closing downward, a float located below said pan and operatively connected to said valve and adapted to rise to depress said valve and close said discharge outlet.

3. A device of the character described comprising a receiving pan having an overflow outlet and a bottom having a discharge outlet, a valve mounted in said discharge outlet, a valve stem carrying said valve, a strainer surrounding said discharge opening and said valve, a float below said bottom and having a stem extending upward through a tubular extension of said bottom, a double-armed lever operatively connecting the upper ends of said float stem and valve stem respectively and adapted to depress said valve when said float is lifted.

In testimony whereof I have affixed my signature.

JOSEPH ALFRED FRASER.